A. J. FLEITER.
APPARATUS FOR CURING TIRES UNDER INTERNAL PRESSURE.
APPLICATION FILED SEPT. 3, 1921.
1,404,949.
Patented Jan. 31, 1922.
2 SHEETS—SHEET 1.
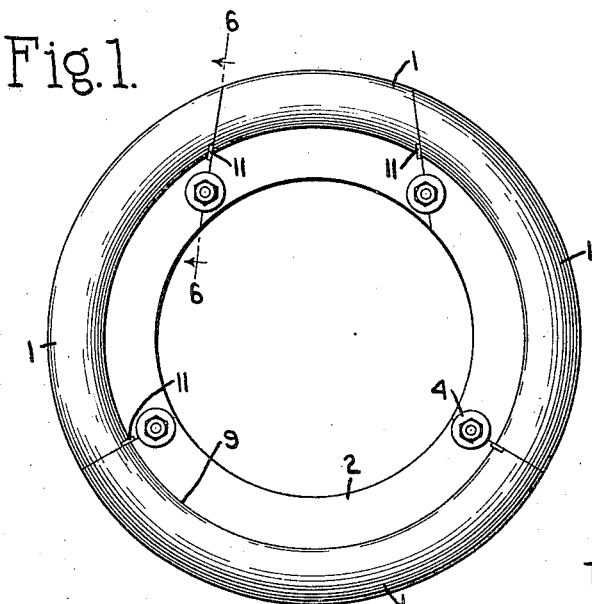
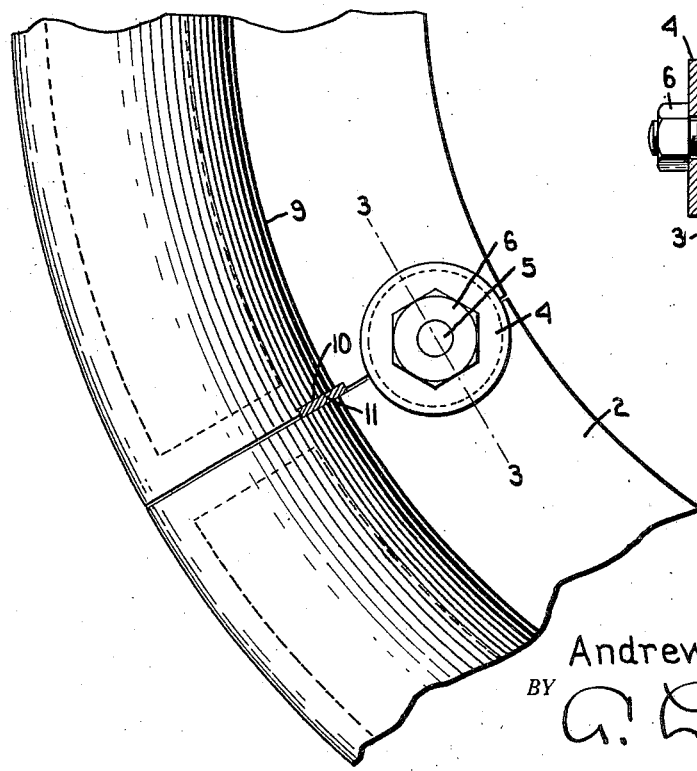
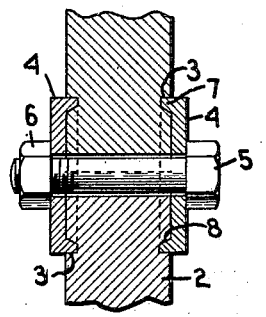
INVENTOR.
Andrew J. Fleiter
BY
ATTORNEY.

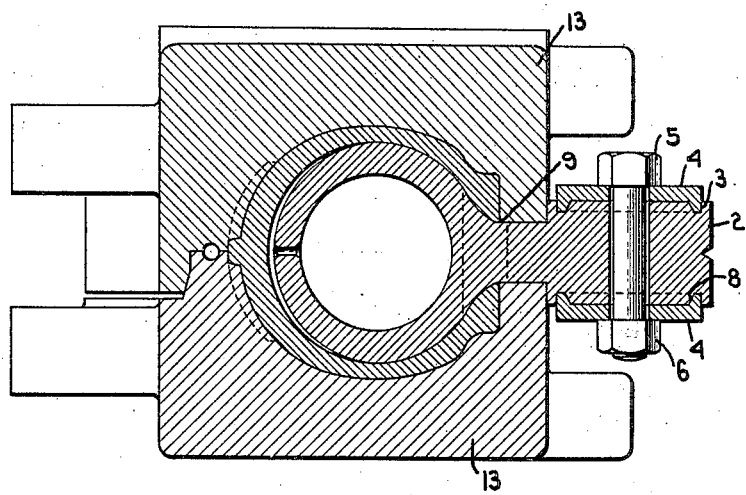
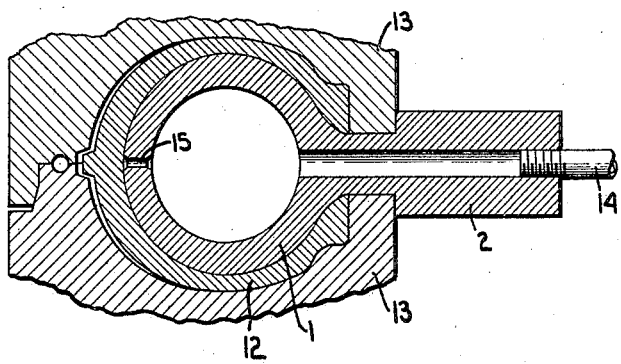
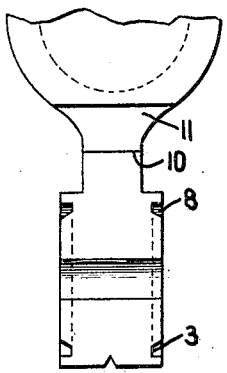

UNITED STATES PATENT OFFICE.

ANDREW J. FLEITER, OF AKRON, OHIO.

APPARATUS FOR CURING TIRES UNDER INTERNAL PRESSURE.

1,404,949.

Specification of Letters Patent.

Patented Jan. 31, 1922.

Application filed September 3, 1921. Serial No. 498,191.

*To all whom it may concern:*

Be it known that I, ANDREW J. FLEITER, a citizen of the United States, residing at Akron, in the county of Summit, State of Ohio, have invented certain new and useful Improvements in Apparatus for Curing Tires Under Internal Pressure, of which the following is a specification.

This invention relates to an apparatus for curing tires under internal pressure, and particularly to a form of core on which a tire may be cured by the introduction of the fluid pressure directly into the tire on the building core and without the use of an expansible medium inserted within the tire and adapted to receive the pressure fluid.

Heretofore tires of the clincher type have been expanded and molded upon the cores on which they are built, and as the cores are solid or in one piece, when the beads of the tire are compressed against the side of the core by the mold, it has been possible to inject the fluid pressure within the casing without danger of leakage. With tires of the straight side or inextensible bead type, it is necessary however, to make the core into a plurality of sections, and the fluid pressure will, unless means are provided to seal the same, leak through the cracks between the sections of the core. It is the purpose of my invention to construct a form of sectional tire core, which will be provided with sealing means to effectually close up the cracks between the several sections and prevent leakage of the fluid pressure.

To this end my invention may be embodied in the form of apparatus described herein and shown in the drawings, but it will be understood that I am not limited to exactness in the details, or of means employed to obtain the desired results, but the invention may be varied and modified as may seem advisable, the principles of the invention being understood.

In the drawings:

Fig. 1 is an elevation of a complete tire core of the sectional or collapsible type, having my invention applied and embodied therein.

Fig. 2 is an enlarged view of a portion of the core at the division point or sectional line.

Fig. 3 is a section on the line 3—3 of Fig. 2.

Fig. 4 is a radial section through the core within the mold, the tire being shown as expanded by the internal fluid pressure.

Fig. 5 is a similar fragmentary cross section, taken at the point where the fluid pressure is injected into the tire, showing the tire in unexpanded condition.

Fig. 6 is a detail of the end of a core section taken on the line 6—6 of Fig. 1.

The core is composed of the usual number of sections 1, divided as is customary, so as to permit the removal of the sections from the finished tire. On the tongue or inner flange 2 of the several sections are formed at the ends of the sections, semi-circular grooves 3, which, when the sections are assembled as shown in Fig. 1 form complete circles extending over the dividing lines between the sections. These circular recesses or grooves are formed on both sides of the core, and are designed to receive plates or washers 4, headed bolts 5 and nuts 6 drawing the plates or washers into position with annular flanges 7 seated in the grooves 3.

The inner wall of each groove and the inner wall of each flange 7 are correspondingly tapered as at 8, and as a result of this construction, as each pair of washers 4 is drawn into place upon tightening of the nut 6, the adjacent sections are drawn together end to end. The drawing together of pair of adjacent sections is independent of the other sections and it is therefore possible to exert a powerful and individual clamping action at each division line of the core. This is a valuable and important feature of my invention and co-operates with the sealing device between the two core sections to effectually prevent escape of fluid pressure.

At one end of each core section at the bead line 9, preferably extending both above and below the said line is formed a recess 10, in which is received a packing or gasket 11, of rubber or other compressible sealing substance.

When the sections of the core are assembled and the washers or plates 4, drawn up tightly on both sides of the core, the several gaskets between the sections will be compressed tightly by the drawing together of the sections and the cracks will be effectually sealed. As each joint is separately and individually drawn together the sealing of all the cracks will be perfected, which would not be the case were the clamping action exerted upon all of the sections by a single clamping ring.

The tire, of the straight-side or inextensible bead variety is shown at 12 and the two mold sections at 13. The mold cavity is so designed that the lower edges about the beads of the tire are tightly compressed between the mold and the core so as to form an effectual seal about the edges of the casing. The upper or tread portion of the mold is somewhat larger than the tire so as to permit the desired amount of stretch or expansion of the casing upon the admission of the fluid pressure, as shown in Figs. 4 and 5. One of the core sections is provided with an inlet pipe 14 into which the fluid pressure is admitted, an opening 15 being provided at the tread or crown of the core for the passage of the fluid into the tire.

It is thought that the description of the invention has been sufficiently detailed and accurate to enable an understanding of it. The device as shown will be fluid tight around the edges of the tire and at the joints of the core. The gaskets 11 are so located and of such size as to be compressed upon the clamping of the core. Other forms of locking or clamping means may be substituted for that shown, without departing from the essentials of the invention.

Claims:

1. In a device of the character set forth, the combination of a sectional tire core, fluid tight packing strips located in the cracks between the core sections, and means to hold the core sections together in assembled relation.

2. In a device of the character set forth, the combination of a sectional tire core, packing strips located between the abutting ends of the sections and clamping devices adapted to draw the sections together in assembled relation and compress the strips between the sections.

3. In a device of the character set forth, the combination of a sectional tire core, packing strips located between the abutting ends of the sections and clamping devices on both sides of the core, adapted to draw the sections together in assembled relation and compress the strips between the sections.

4. In a device of the character set forth, the combination of a sectional tire core, fluid tight packing strips located between the abutting ends of the sections at the bead line of the core, and clamping devices adapted to draw the sections together from both sides of the core and hold them in assembled relation.

5. In a device of the character set forth, the combination of a sectional tire core, compressible packing strips located between the abutting ends of the sections, and individual clamping devices at each core joint, said clamping devices being so arranged as to draw the several core sections together end to end to compress the packing strips to form a fluid tight joint between the core sections.

6. In a device of the character described, the combination of a plurality of core sections, arranged so that when assembled they form a complete annular core ring, a clamping plate at each core joint, the surface of the clamping plate engaging the core being provided with a tapering surface, means to draw the plates against the core sections and compressible packing strips located between the ends of the core sections and compressed upon the drawing up of the plate to form a fluid tight joint between the core sections.

7. In a device of the character set forth, the combination of a plurality of tire core sections, a clamping washer at each core joint, an inwardly tapering surface on the under face of each washer, and a correspondingly tapered surface on the core with which said face engages, means to draw the plate inwardly toward the core and a packing strip carried in one end of each core section.

8. In a device of the character set forth, the combination of a plurality of tire core sections, two clamping washers at either side of the core at each section line, a packing strip carried on said core between the sections, means to draw the clamping washers against the core to clamp the sections together and means to introduce a fluid between the outer surface of the core and the tire.

9. In a device of the character set forth, the combination of a plurality of tire core sections, two clamping washers at either side of the core at each section line, a packing strip carried on said core between the sections, and means to draw the clamping washers against the core to clamp the sections together, said washers being provided with tapering surfaces which serve to draw the core sections together and compress the packing strip.

10. In a device of the character set forth, a plurality of tire core sections, packing strips located between the sections and individual clamping devices at each section line, said devices acting to hold the several sections together and exert a clamping action which draws the sections together and compresses the said packing strips.

11. In a device of the character set forth, a plurality of tire core sections, packing strips located between the sections and individual clamping devices on both sides of the core at the several section lines, said devices acting to hold the sections together and exert a clamping action which draws the sections together end to end and compresses the said packing strips.

12. A tire core, comprising a plurality of sections, means to conduct fluid pressure to the outer surface of the core and means to seal the joints between the several sections to prevent leakage of the fluid pressure.

13. A tire vulcanizing core, said core comprising a plurality of sections, means to clamp the sections end to end, and fluid tight sealing means between the sections.

14. A tire vulcanizing core, said core comprising a plurality of sections, means to clamp the sections end to end, fluid tight sealing means between the sections and means to admit fluid pressure between the tire and the surface of the core.

ANDREW J. FLEITER.